United States Patent [19]

Imai et al.

[11] Patent Number: 5,025,902
[45] Date of Patent: Jun. 25, 1991

[54] BIDIRECTIONAL DIFFERENTIAL CLUTCH

[75] Inventors: Munehisa Imai; Atsushi Asano; Tsutomu Yasue, all of Nagoya; Kenichiro Ito, Shizuoka; Hiromi Nojiri, Shizuoka, all of Japan

[73] Assignees: Aichi Kikai Kogyo Kabushiki Kaisha, Nagoya; NTN Corporation, Osaka, both of Japan

[21] Appl. No.: 460,545

[22] Filed: Jan. 3, 1990

[51] Int. Cl.$^5$ .................. B60K 23/08; F16D 41/10
[52] U.S. Cl. ......................... 192/43; 192/44; 180/249
[58] Field of Search ............... 192/43, 43.1, 43.2, 192/44, 35; 74/650; 180/248, 249

[56] References Cited

U.S. PATENT DOCUMENTS

| | | | |
|---|---|---|---|
| 3,300,002 | 11/1966 | Roper | 192/35 |
| 3,324,744 | 6/1967 | Roper | 192/44 X |
| 3,344,686 | 10/1967 | Baker | 192/35 X |
| 3,517,573 | 6/1970 | Roper | 192/44 X |
| 3,993,152 | 11/1976 | Fogelberg | 192/35 X |
| 4,124,085 | 11/1978 | Fogelberg | 192/44 X |
| 4,852,707 | 8/1989 | Ito et al. | 192/44 |

Primary Examiner—Richard Lorence
Attorney, Agent, or Firm—Dennison, Meserole, Pollack & Scheiner

[57] ABSTRACT

The bidirectional differential clutch enables to transmit or cutoff both clockwise and counterwise rotation at the input side. The clutch comprises an input gear having a first cylindrical surface, an output gear having a second cylindrical surface disposed with a space to the first cylindrical surface so as to be relatively rotatable, a plurality of engaging members interposed in the space, a holding member inserted into the space, the holding member having a pocket storing the engaging members, the engaging members being for operation from a neutral position in which both cylindrical surfaces are not engaged with each other to an operational position in which both cylindrical surfaces are engaged with each other, a sub-gear producing differential velocity in correspondence to the rotation of the input gear, and the holding member being linked with the sub-gear to slide in a peripheral direction by the differential velocity to operate the engaging members to the operational position. The engaging members may be rollers or sprags.

5 Claims, 18 Drawing Sheets

BIDIRECTIONAL DIFFERENTIAL CLUTCH

BACKGROUND OF THE INVENTION

1. Field of the Invention

The present invention relates to a bidirectional differential clutch which enables to transmit or cutoff both clockwise and counterclockwise rotation at the input side.

2. Description of the Prior Art

An over-running type clutch or a differential clutch which enables to transmit driving force to front wheels automatically a the instant of falling speed due to slip of rear wheels has come to be employed on a part-time type four wheel driving car (hereinafter also referred to as a 4WD car).

In this differential clutch, front wheel hubs are designed to rotate faster than a drive shaft so that the rotation of the drive shaft may not be transmitted to front wheel hubs in driving with two wheels. When rear wheels slip and the rotation of the drive shaft increases, the drive shaft and the front wheel hub come to engagement due to wedge like action of rollers or balls inserted into the clearance of the drive shaft and the front wheel hub, thus the rotation being transmitted to the front wheel hub.

In order to produce this wedge-like action on the differential clutch, the front surface of the drive shaft is provided with a saw tooth like cam. As it operates only in one way rotation, there was a problem that front wheels can not be driven in going backwards. Also in differential clutches using sprags instead of rollers or balls, the operation of sprags was limited to one direction, resulting in the same problem.

The present invention was made to solve the above-described problem and it is an object to provide a bidirectional differential clutch which enables to transmit or cutoff both clockwise and counterclockwise rotation at the input side.

SUMMARY OF THE INVENTION

The bidirectional differential clutch comprises an input gear having a first cylindrical surface, an output gear having a second cylindrical surface disposed with a space to said first cylindrical surface so as to be relatively rotatable, a plurality of engaging members interposed in the space, a holding member inserted into the space, the holding member having a pocket storing said engaging member, the engaging member being for operation from a neutral position in which both cylindrical surfaces are not engaged with each other to a operational position in which both cylindrical surfaces are engaged with each other, a sub-gear producing differential velocity in correspondence to the rotation of the input gear, and the holding member being linked with said sub-gear to slide in a peripheral direction by the differential velocity to operate the engaging member to the operational position. The engaging members may be rollers or sprags.

When the number of teeth of the sub-gear is greater than the number of teeth of the input gear, the sub-gear rotates later than the input gear by the same rotation input, thus producing differential velocity between both gears. Due to this differential velocity, sprags, for example, are tilted whichever the rotation is clockwise or counterclockwise to bring about a state of engagement between the rotation shaft and the output gear. Wherefore, the rotation of the input gear in the clockwise or counterclockwise direction can be transmitted to or cutoff from the output gear.

BRIEF DESCRIPTION OF THE DRAWINGS

The present invention will now be explained with reference to the drawings.

DETAILED DESCRIPTION OF THE INVENTION

Figure 1:
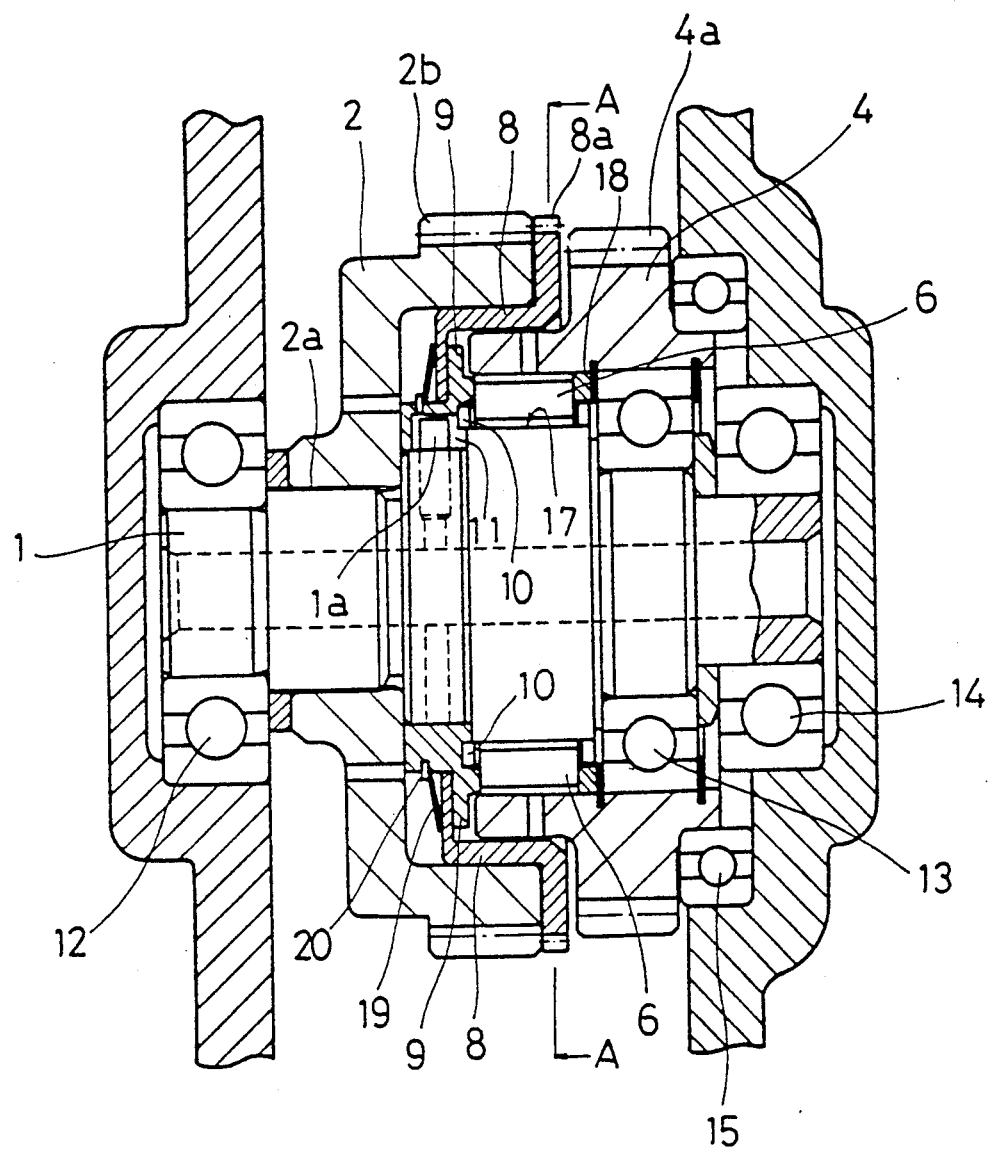
FIG. 1 is a vertical section of the first embodiment according to the invention.
Figure 2:
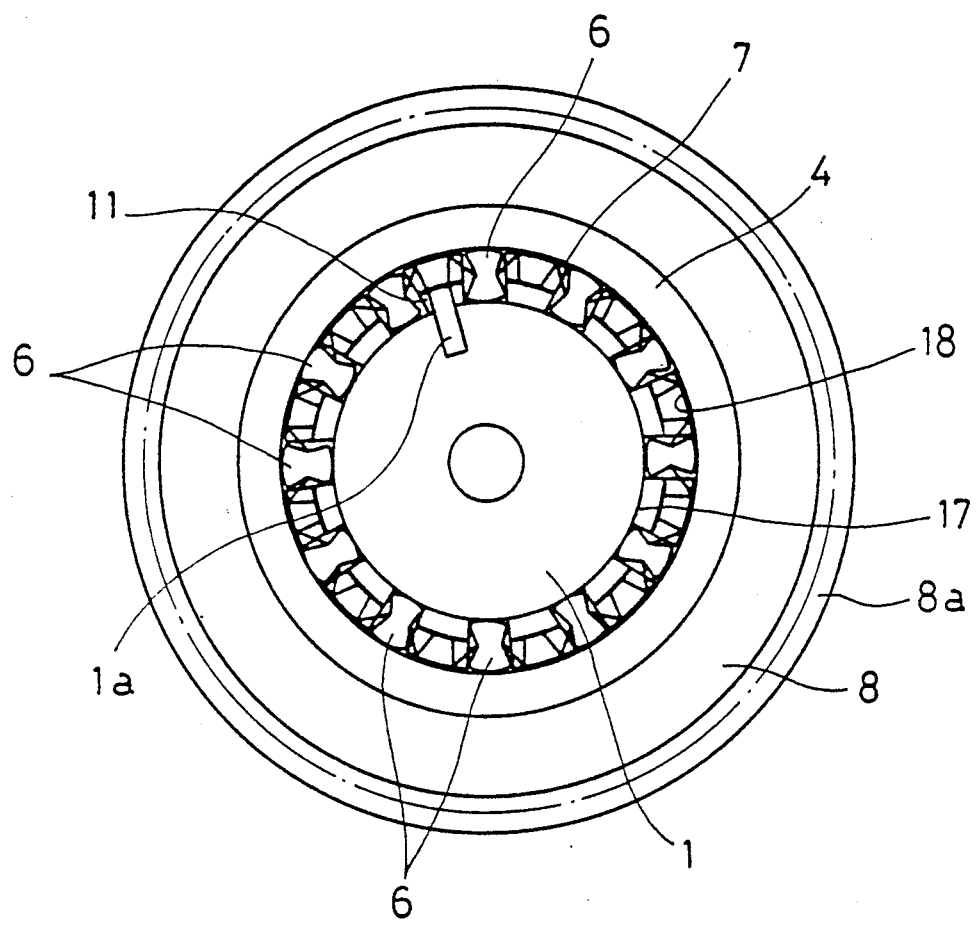
FIG. 2 is a transverse cross section taken along line A—A of FIG. 1.
Figure 3:
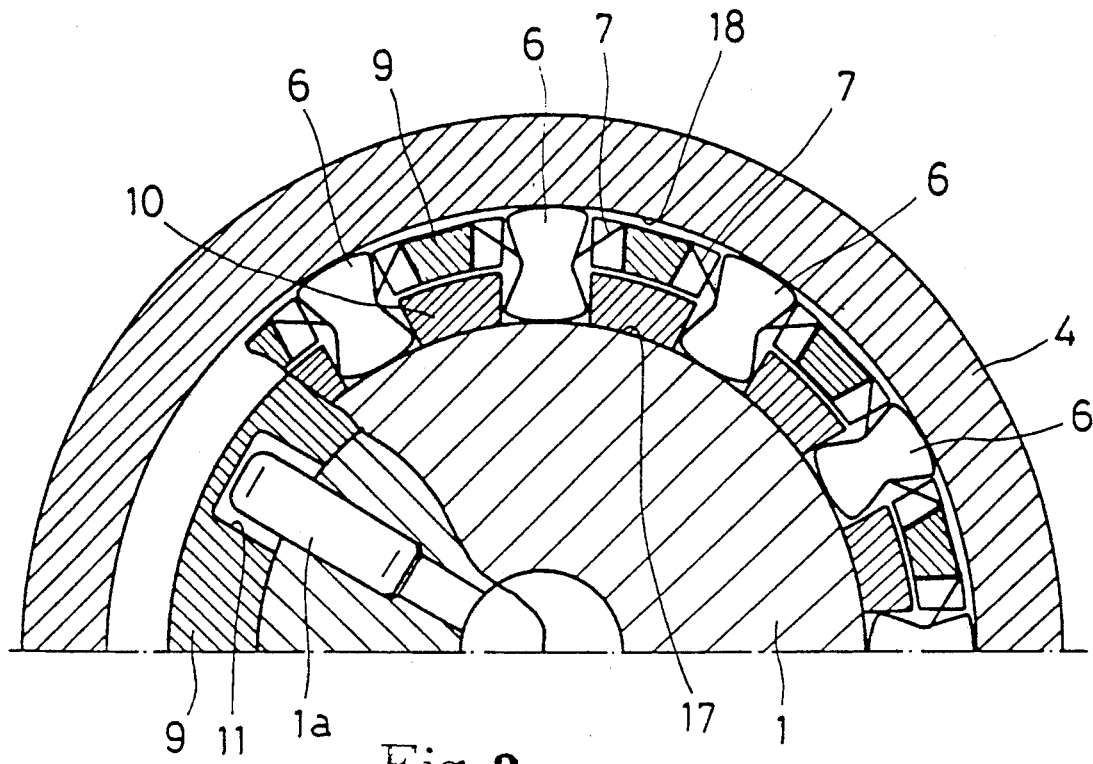
FIGS. 3 and 4 illustrate operation.

In FIG. 1, 1 is a rotation shaft having various stepped portions on the outer peripheral surface. 2 is an input gear which is connected to one of the stepped portions of the rotation shaft 1 through a spline 2a. 2b is a tooth formed on the outer periphery of the input gear 2, which is engaged with a gear of a drive shaft (not shown). 17 is an outer peripheral cylindrical surface, which is formed on another stepped portion of the outer periphery of the rotation shaft 1 in parallel to the input gear 2. 4 is an output gear having an inner peripheral cylindrical surface 18, which is disposed with clearance to the outer periphery of the outer peripheral cylindrical surface 17. 4a is a tooth formed on the outer periphery of the output gear 4, which is engaged with a gear of a driven shaft (not shown).

Figure 6:
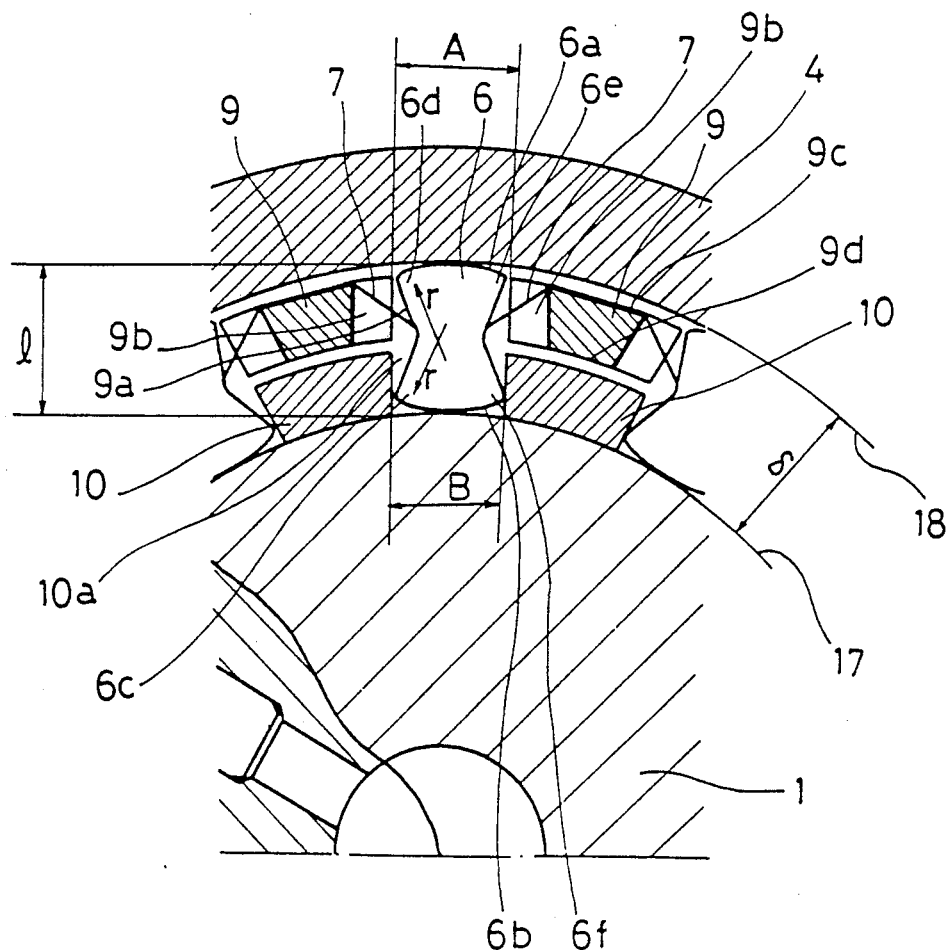

As shown in an enlarged view of important parts of FIG. 6, a plurality of sprags 6 are disposed at fixed intervals in a peripheral direction between the inner peripheral cylindrical surface 18 of the output gear 4 and the outer peripheral cylindrical surface 17 of the rotation shaft 1.

A circular surface 6a at the outer diameter side of the sprag 6 and another circular surface 6b at the inner diameter side are circular surfaces of a radius value r and designed longer than a half of the interval d between the inner peripheral cylindrical surface 18 of the output gear 4 and the outer peripheral cylindrical surface 17 of the rotation shaft 1. The length 1 in the direction of connecting the centers of the radius values r of the circular surfaces 6a, 6b is somewhat shorter than the interval d. Therefore, in the neutral state which the sprag 6 stands up between the opposing cylindrical surfaces 17, 18, there is formed radial clearance between the circular surfaces 6a, 6b of the sprag 6 and the cylindrical surfaces 17, 18. When the sprag 6 falls down from the neutral state in the peripheral direction of the cylindrical surfaces 17, 18, the circular surface 6a at the outer diameter side and the circular surface 6b at the inner diameter side are engaged with the opposing cylindrical surfaces 17, 18.

Figure 5:
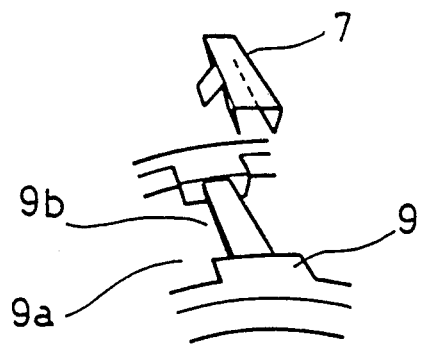
FIGS. 5 and 6 are enlarged views of the relevant parts.

End portions 6c, 6f at the inner diameter side of the sprag 6 are caught in a pocket 10a of the inside holding member 10 which is fixed on the outer peripheral cylindrical surface 17 of the rotation shaft 1 via pressing in or other methods. End portions 6d, 6e at the outer diameter side are caught in a pocket 9a of the outside holding member 9 which is inserted between the inside holding member 10 and the output gear 4 slidably with reference to the rotation shaft 1. The length A between the sides opposing in the peripheral direction of the pockets 9a of the outside holding members 9 is larger than the length B between the sides opposing in the peripheral direction of the pockets 10a of the inside holding members 10. In a recess 9b which is formed in the central portion of the opposing sides in the peripheral direction of the pocket 9a of the outside holding member 9, a pair of elastic members 7 press the end portions 6d, 6e at the outside diameter side of the sprag 6 from both sides to hold neutral the sprag 6 as shown in FIG. 6. The elastic member can be made of leaf springs, coil springs and others. In this embodiment, a metal leaf spring as an elastic member 7 is fixed from the outer portion 9c of the outside holding member 9 as shown in FIG. 5. However, it may be fixed from the inner portion 9d of the outside holding member 9.

Back to FIG. 1, 8 is a sub-gear which is inserted between the input gear 2 and the output gear 4. 8a is a tooth provided on the outer periphery of the sub-gear 8 which engages with a gear on the drive shaft (not shown) as in the case of the input gear 2. At the inner peripheral side of the sub-gear 8, the outside holding member 9 is inserted slidably around the rotation shaft 1. The sub-gear 8 is pressed in contact via a belleville spring 19 between a retaining ring 20 fixed to the outside holding member 9 and the side surface of the stepped portion of the outside holding member 9. The inner peripheral side of the outside holding member 9 is partially cut out to make a cutout 11. Opposing to the cutout 11, a stopper 1a is protruded on the rotation shaft 1. 12 and 14 are bearings supporting the rotation shaft 1. 13 and 15 are bearings supporting the output gear 4.

The operation of the bidirectional differential clutch constituted as described in the above will now be explained.

Figure 4:
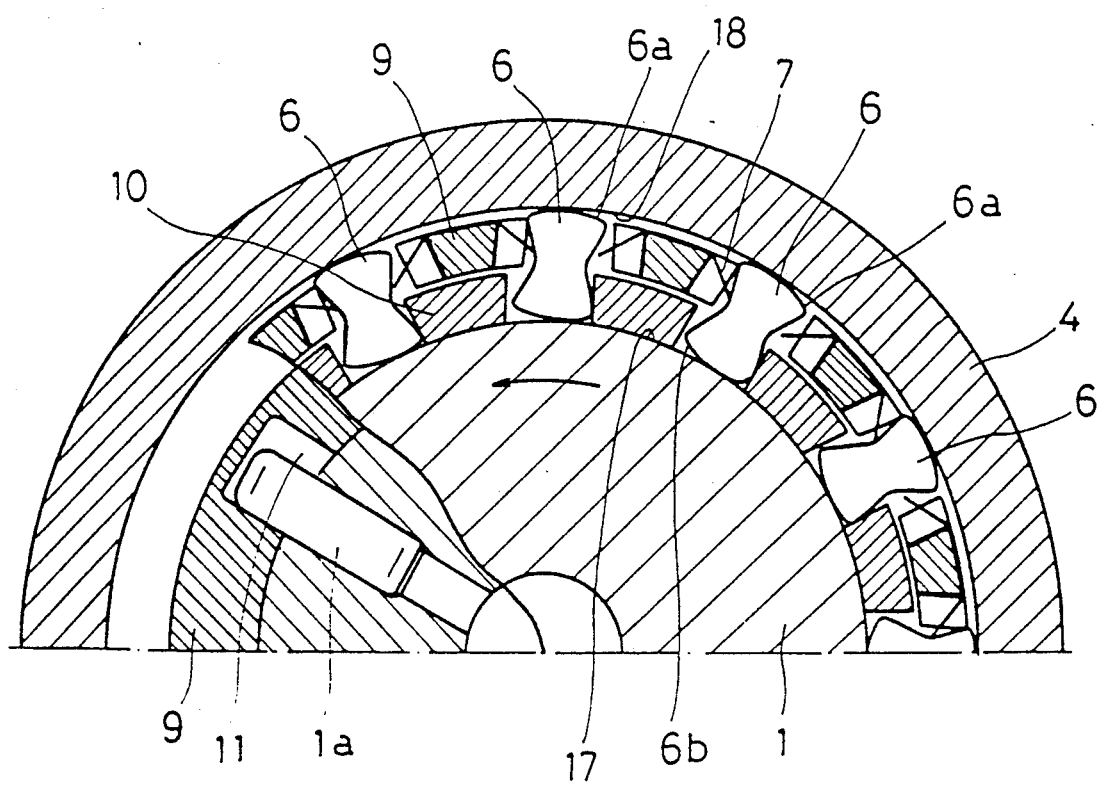

In using this bidirectional differential clutch for the power transmission of the part-time type 4WD car, for example, the rotation of the drive shaft is transmitted to the input gear 2 and the sub-gear 8 engaging therewith. However, the rotation of the sub-gear 8 is later than the rotation of the input gear 2 in spite of the rotation of the same drive shaft because the teeth 2b of the input gear 2 are 53, for example, against the teeth 8a of the sub-gear 8 are 54, for example. Accordingly, as shown in FIG. 4, the outside holding member 9 being pressed in contact by the sub-gear 8 rotates relatively in the clockwise direction with differential velocity against the rotation of the rotation shaft 1 until the left side surface of the cutout 11 of the outside holding member 9 abuts the stopper 1a. The sprag 6 stored in the pocket 9a of outside holding member 9 falls down in the rotational direction of the outside holding member 9. Therefore, as shown in FIG. 4, the circular surface at the outer diameter side 6a of the sprag surface at the inner diameter side 6b engage with opposing cylindrical surfaces 17, 18 enabling the clutch to operate in the direction shown by an arrow mark.

When the 4WD car is driving with two wheels, the rotation of the output gear 4 is set to rotate faster than the input gear 2 or the rotation of the rotation shaft 1. Accordingly, the sprag 6 is effected by the frictional force to stand up for idle running without bite in the cylindrical surfaces 17, 18. On the other hand, when rear wheels slip, the rotation of the drive shaft increases, the rotation of the input gear 2 or the rotation shaft 1 becomes faster than the rotation of the output gear 4, and the clutch operates in the arrow-marked shaft 1 to the output gear 4. After the stopper 1a abuts the wall surface of the cutout 11, the outside holding member 9 runs idly, and there is no destruction on the sub-gear 8.

As described in the above, the clutch operational principle of the sprag 6 based on the differential velocity of the sub-gear 8 has no relation with the direction of the rotation of the output gear 2. Accordingly, the bidirectional differential clutch is effective in going backwards of the part-time type 4 wheel drive car.

Figure 7:
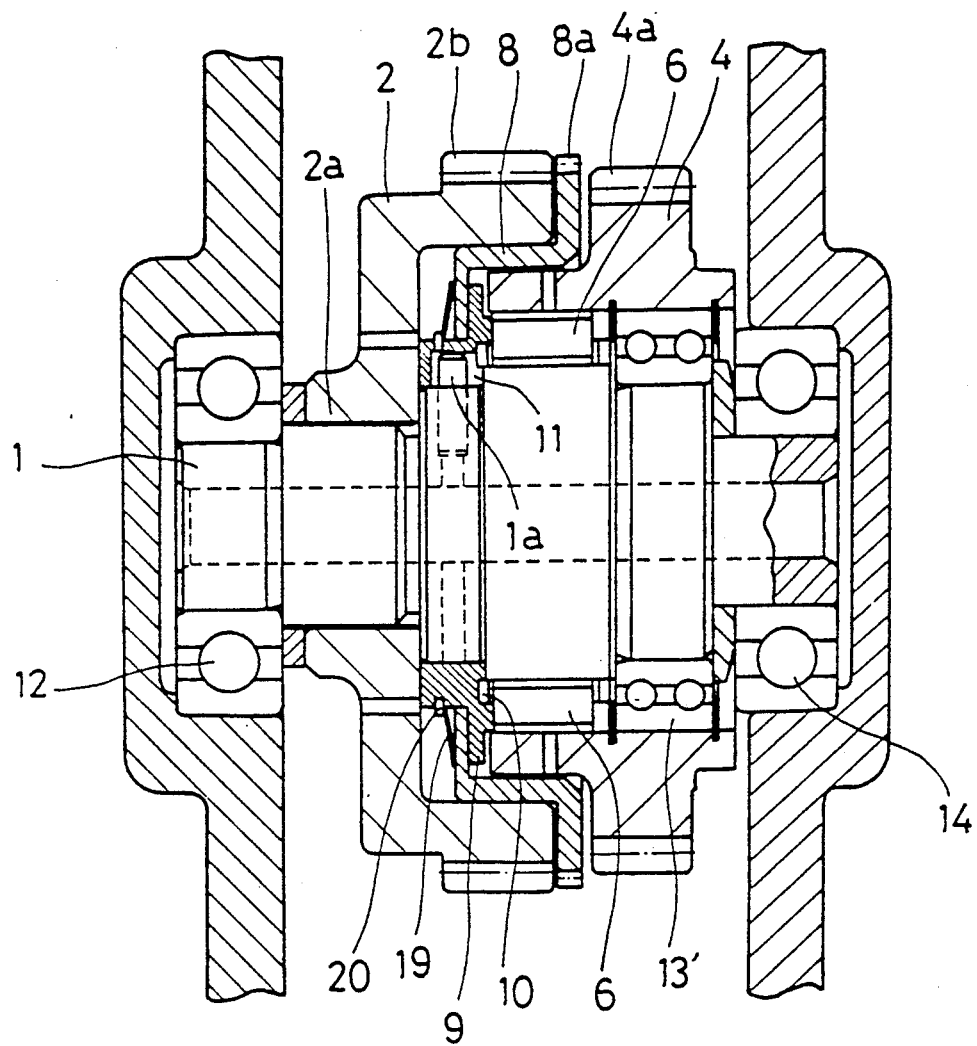
FIG. 7 is a vertical section of the second embodiment.

FIG. 7 shows a second embodiment of this invention which the bearings 13, 15 supporting the output gear 4 are replaced by bearings 13'.

The bidirectional differential clutch of this invention has constitution that a cylindrical surface at an input gear side and a cylindrical surface at an output gear side are disposed with a space so that they can rotate relatively and a plurality of sprags are interposed in the space, wherein the sprags are stored in a pocket of a first holding member fixed on the cylindrical surface at the input gear side and a pocket of a second holding member disposed adjacent to the cylindrical surface at the output gear side and slidably in a peripheral direction, the sprags are disposed so as to be tiltable from a neutral position which is not engaged with the cylindrical surface at the input gear side nor the cylindrical surface at the output gear side to a clutch operational position where engages with both cylindrical surfaces, the second holding member is linked with a sub-gear producing differential velocity in correspondence to the rotation of the input gear, thus the second holding member sliding in a peripheral direction by the differential velocity to tilt the sprag to the clutch operational position.

Accordingly, the rotation of the input gear can be transmitted to or cut off from the output gear wherever it is clockwise or counterclockwise.

Figure 8:
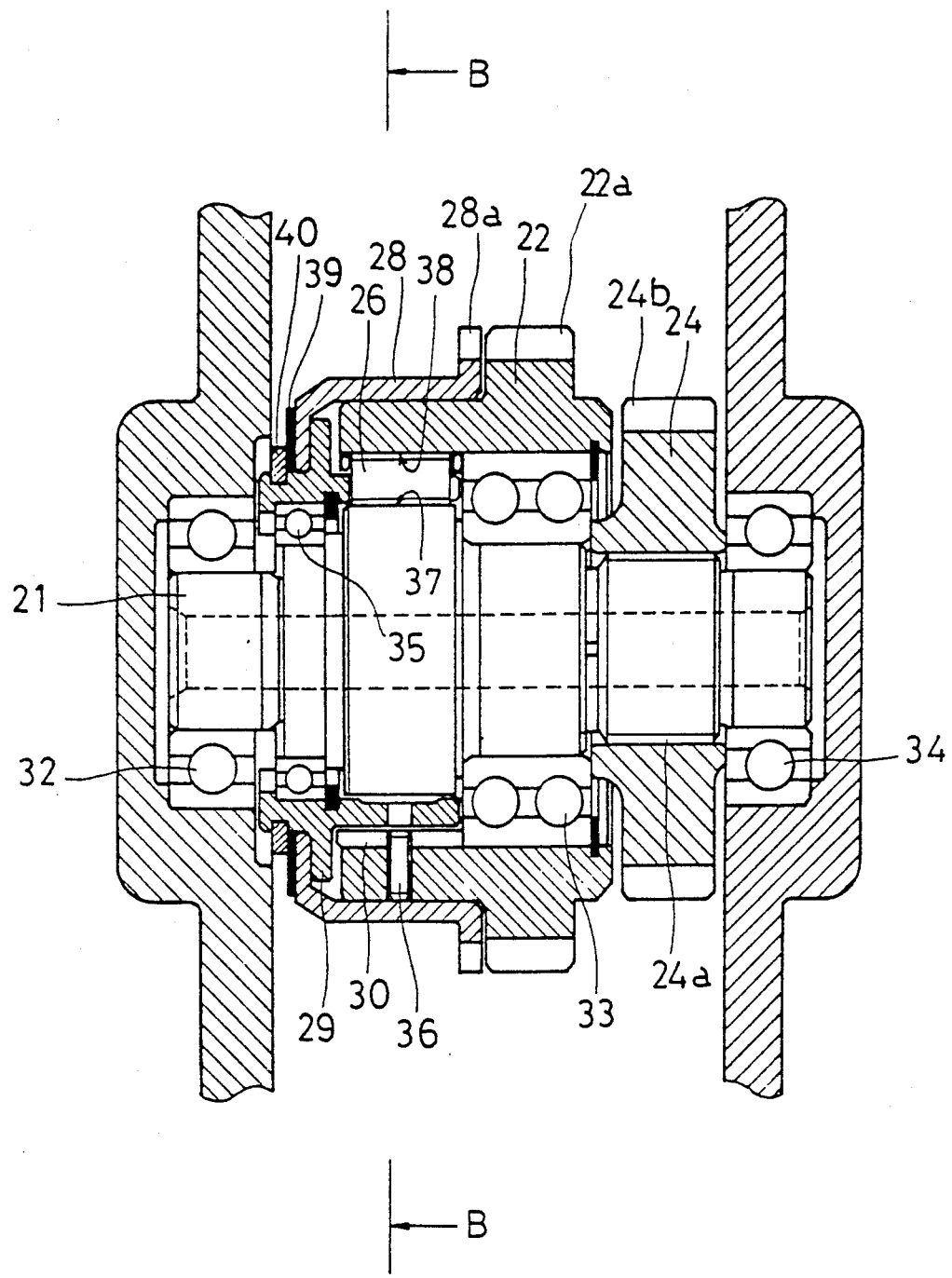
FIG. 8 is a vertical section of the third embodiment.
Figure 9:
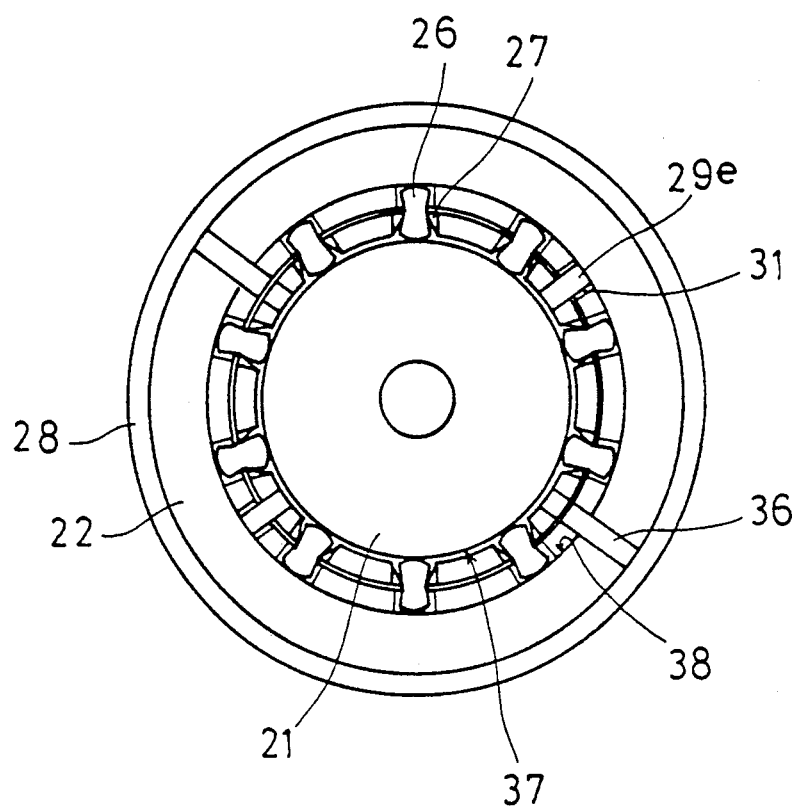
FIG. 9 is a transverse cross section taken along line B—B of FIG. 8.
Figure 10:
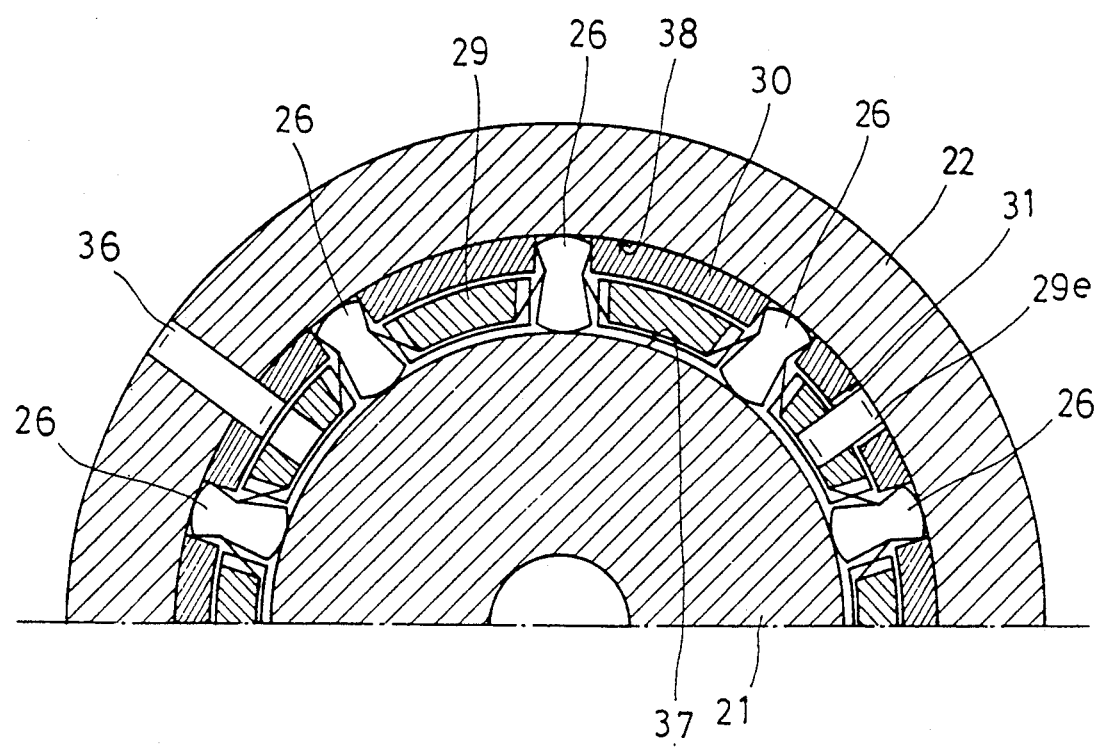
FIGS. 10 and 11 illustrate operation of the third embodiment.

In FIG. 8, 21 is a rotation shaft having various stepped portions on the outer peripheral surface. 24 is an output gear which is connected to one of the stepped portions of the rotation shaft 21 through a spline 24a. 24b is a tooth formed on the outer periphery of the output gear 24, which is engaged with a gear of a driven shaft (not shown). 37 is an outer peripheral cylindrical surface, which is formed on another stepped portion of the outer periphery of the rotation shaft 21. 22 is an input gear having an inner peripheral cylindrical surface 38, which is disposed with clearance to the outer periphery of the outer peripheral cylindrical surface 37.

22a is a tooth formed on the outer periphery of the input gear 22, which is engaged with a gear of a driving shaft (not shown).

Figure 13:
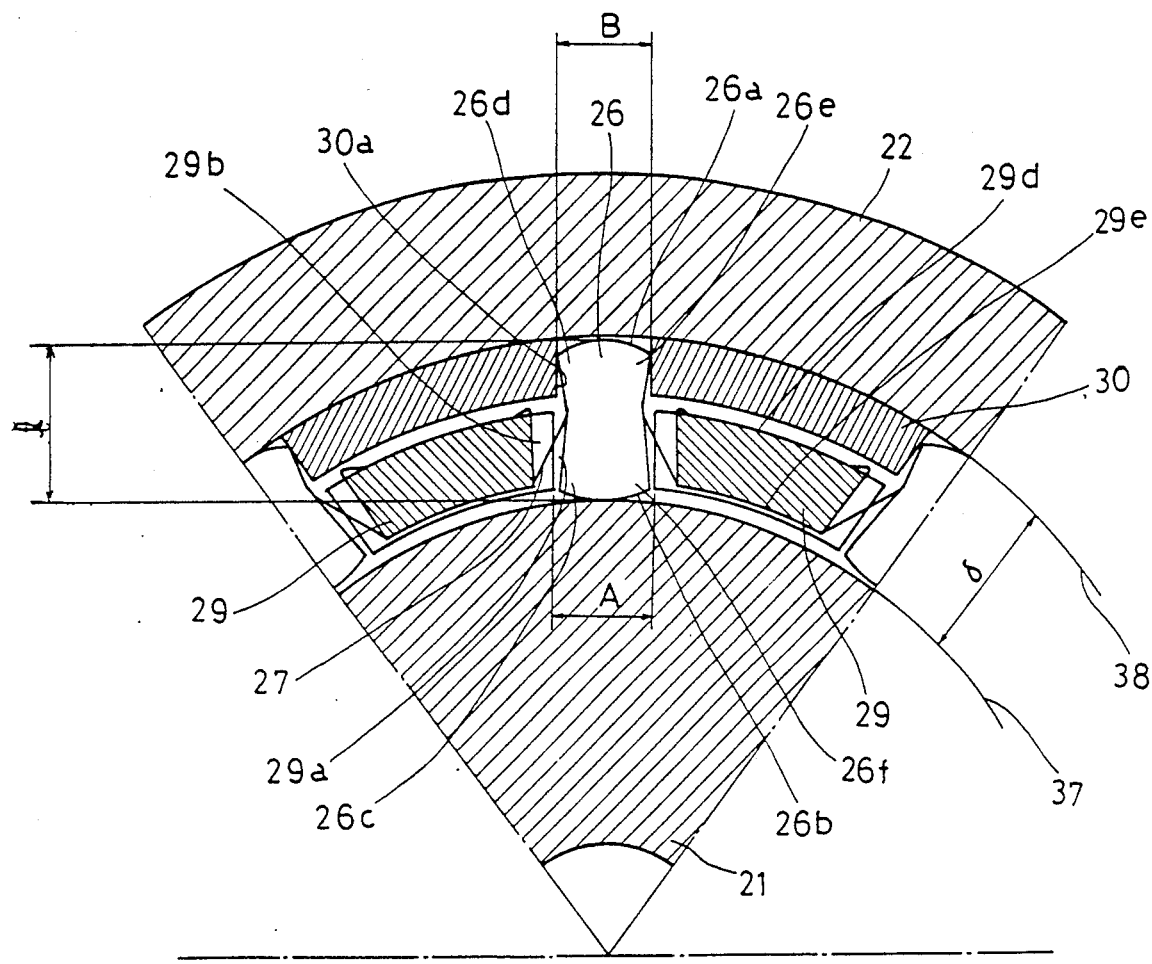

As shown in an enlarged view of important parts of FIG. 13, a plurality of sprags 26 are disposed at fixed intervals in a peripheral direction between the inner peripheral cylindrical surface 38 of the input gear 22 and the outer peripheral cylindrical surface 37 of the rotation shaft 21.

Figures 14, 15:
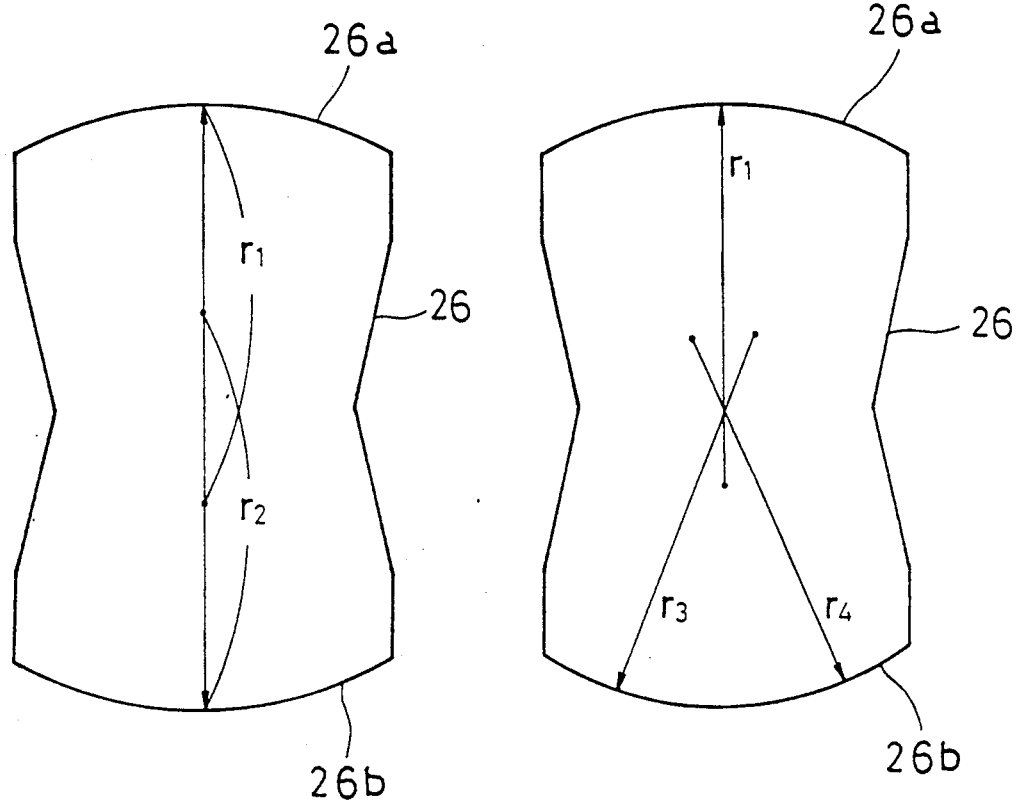
FIGS. 14 and 15 are cross sectional views of the sprag alone of the third embodiment.

A circular surface 26a at the outer diameter side of the sprag 26 and another circular surface 26b at the inner diameter side are circular surfaces of each radius value $r_1$, $r_2$ as shown in FIG. 14. The radius values of $r_2$ may be $r_3$ and $r_4$ unsymmetrically in the right and left sides. Each value of $r_1$, $r_2$, $r_3$, and $r_4$ is designed longer than a half of the interval d between the inner peripheral cylindrical surface 38 of the input gear 22 and the outer peripheral cylindrical surface 37 of the rotation shaft 21. The minimum height 1 in the direction of opposing the circular surfaces 26a, 26b to each other is somewhat shorter than the interval d. Therefore, in the neutral state which the sprag 26 stands up between the opposing cylindrical surfaces 37, 38, there is formed radial clearance between the circular surfaces 26a, 26b of the sprag 26 and the cylindrical surfaces 37, 38. When the sprag 26 falls down from the neutral state in the peripheral direction of the cylindrical surfaces 37, 38, the circular surface 26a at the outer diameter side and the circular surface 26b at the inner diameter side are engaged with the opposing cylindrical surfaces 37, 38.

Figure 12:
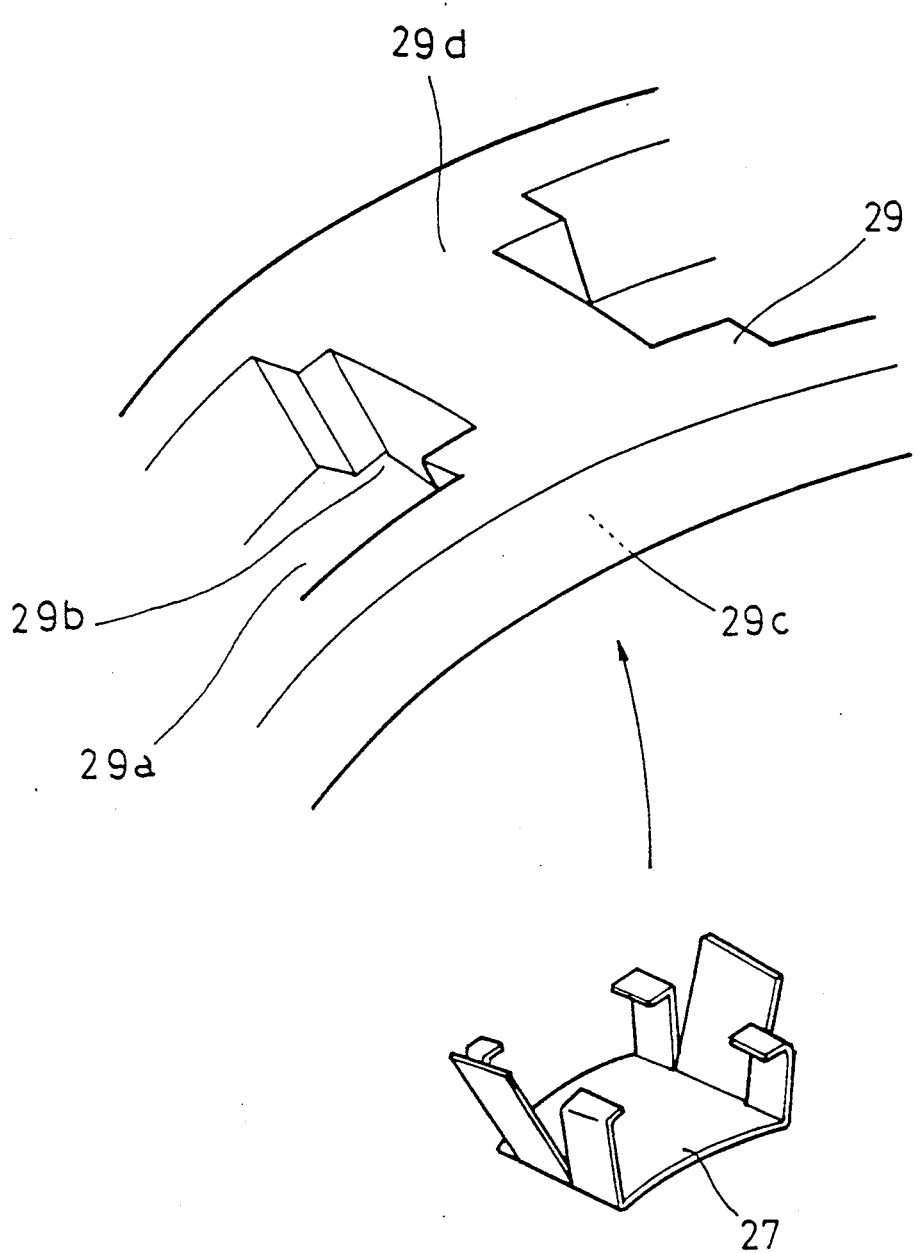
FIGS. 12 and 13 are enlarged views of the relevant parts of the third embodiment.

End portions 26d, 26e at the outer diameter side of the sprag 26 are caught in a pocket 30a of the outside holding member 30 which is fixed on the inner peripheral cylindrical surface 38 of the input gear 22 via pressing in or other methods. End portions 26c, 26f at the inner diameter side are caught in a pocket 29a of the inside holding member 29 which is inserted between the outside holding member 30 and the rotation shaft 21 slidably with reference to the rotation shaft 21. In this embodiment, the outside holding member 30 is secured to the input gear 22 with a pin 36. The length A between the sides opposing in the peripheral direction of the pockets 29a of the inside holding members 29 is larger than the length B between the sides opposing in the peripheral direction of the pockets 30a of the outside holding members 30. In a recess 29b which is formed in the central portion of the opposing sides in the peripheral direction of the pocket 29a of the inside holding member 29, a pair of elastic members 27 press the end portions 26c, 26f at the inside diameter side of the sprag 26 from both sides to hold neutral the sprag 26 as shown in FIG. 13. The elastic member 27 can be made of leaf springs, coil springs and others. In this embodiment, a metal leaf spring as an elastic member 27 is fixed on the inner portion 29c of the inside holding member 29 as shown in FIG. 12. However, it may be fixed on the outer portion 29d of the inside holding member 29.

Back to FIG. 8, 28 is a sub-gear which is inserted adjoining the input gear 22. 28a is a tooth provided on the outer periphery of the sub-gear 28 which engages with a gear on the drive shaft (not shown) as in the case of the input gear 22. Numbers of the teeth of the sub-gear 28 are set to be greater than those of the input gear 22. At the inner peripheral side of the sub-gear 28, the inside holding member 29 is inserted slidably around the rotation shaft 21. The sub-gear 28 is pressed in contact via a belleville spring 39 between a retaining ring 40 fixed to the inside holding member 29 and the side surface of the stepped portion of the inside holding member 29. While a stopper 29e is protruded on the inside holding member 29, a rectangular hole 31 is provided with a clearance to the stopper 29e on the outside holding member 30 opposing the stopper 29e.

32 and 34 are bearings supporting the rotation shaft 21. 33 and 35 are bearings supporting the input gear 22 and the inside holding member 29 respectively.

The operation of the third embodiment constituted as described in the above will now be explained.

Figure 11:
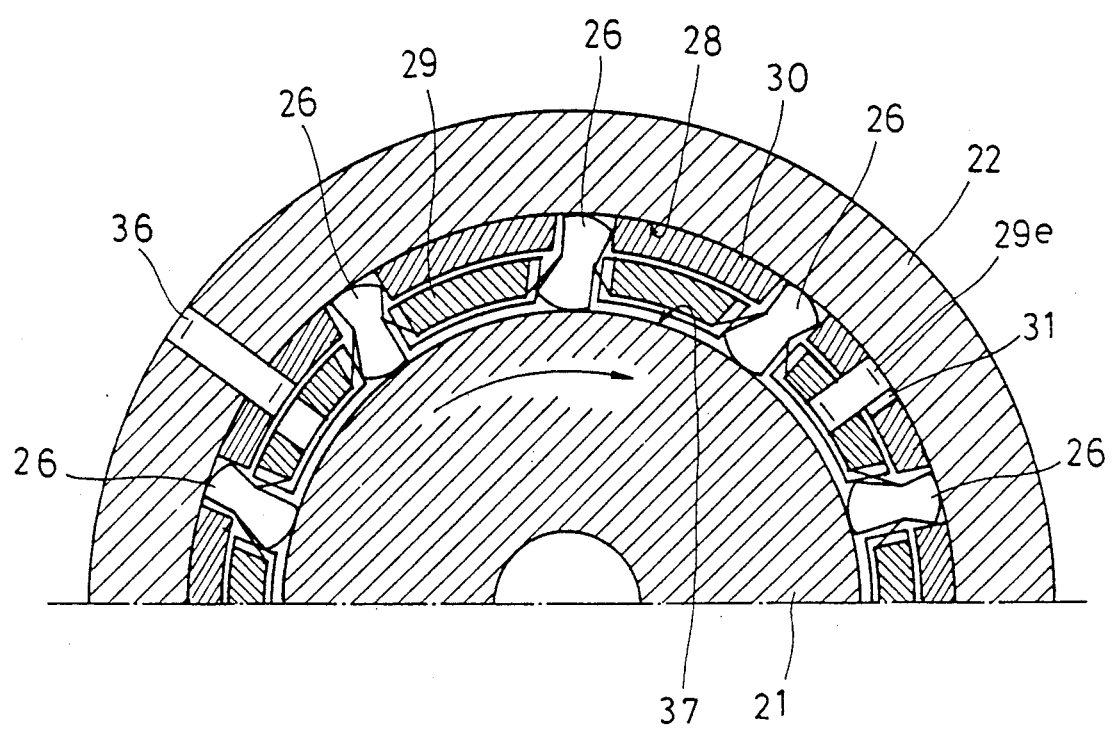

In using this bidirectional differential clutch for the power transmission of the part-time type 4WD car, for example, the rotation of the drive shaft is transmitted to the input gear 22 and the sub-gear 28 engaging therewith. However, the rotation of the sub-gear 28 is later than the rotation of the input gear 22 in spite of the rotation of the same drive shaft because the numbers of teeth 28a of the sub-gear 28 are set to be greater than the numbers of teeth 22a of the input gear 22 in the same manner of the above-mentioned embodiments. Accordingly, as shown in FIG. 11, the inside holding member 29 being pressed in contact by the sub-gear 28 rotates relatively in the counterclockwise direction with differential velocity against the rotation of the input gear 22 until the stopper 29e of the inside holding member 29 abuts the left side surface of the rectangular hole 31. The sprag 26 stored in the pocket 29a of inside holding member 29 falls down in the counter-rotational direction of the inside holding member 29. Therefore, as shown in FIG. 11, the circular surface at the outer diameter side 26a of the sprag 26 and the circular surface at the inner diameter side 26b engage with opposing cylindrical surfaces 37, 38 enabling the clutch to operate in the direction shown by an arrow mark.

When the 4WD car is driving with two wheels, the rotation of the output gear 24 or the rotation shaft 21 is set to rotate faster than the input gear 22. Accordingly, the sprag 26 is effected by the frictional force to stand up for idle running without bite in the cylindrical surfaces 37, 38. On the other hand, when rear wheels slip, the rotation of the drive shaft increases, the rotation of the input gear 22 becomes faster than the rotation of the output gear 24 or the rotation shaft 21, and the clutch operates in the arrow-marked direction, thus transmitting the rotational force of the input gear 22 to the output gear 24. After the stopper 29e abuts the wall surface of the rectangular hole 31, the inside holding member 29 runs idly with respect to the sub-gear 28.

As described in the above, the clutch operational principle of the sprag 26 based on the differential velocity of the sub-gear 28 has no relation with the direction of the rotation of the input gear 22. Accordingly, the bidirectional differential clutch of this embodiment is effective in going backwards of the part-time type 4 wheel drive car.

Furthermore, the sprag 26 is effected by the centrifugal force proportional to the rotational speed of the outside holding member 30 to contact to the inner peripheral cylindrical surface 38 of the input gear 22. Accordingly, when the rotational speed of the input gear 22 comes over the setting speed, the total moment of the centrifugal force acting the sprag 26 and the pressing force of the spring 27 operates the sprag 26 to return to the neutral position. Thus the embodiment has an advantage that the sprag 26 is free from abrasion when the input gear 22 and the rotation shaft 21 rotate idly at the high differential velocity in the disoperational condition of the clutch.

Figure 16:
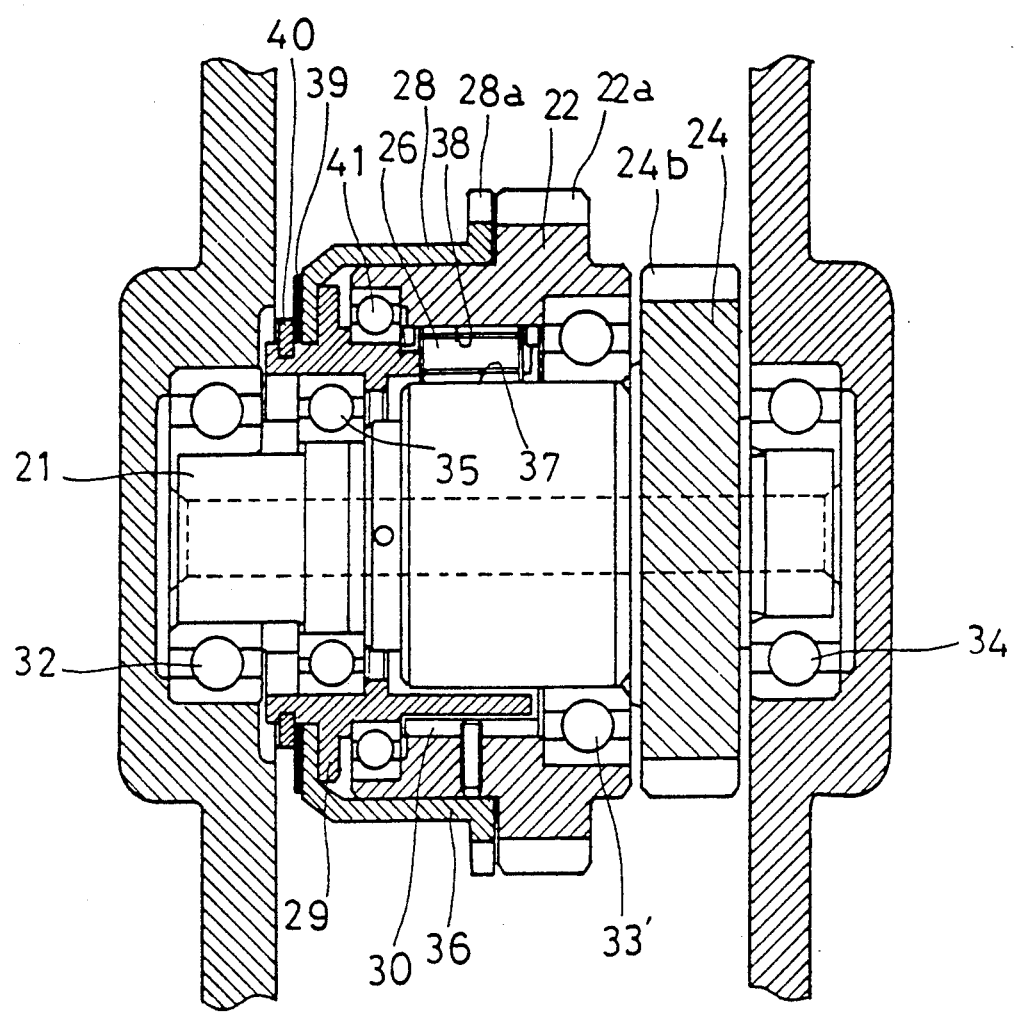
FIG. 16 is a vertical sectional view of the fourth embodiment.

FIG. 16 shows the fourth embodiment of this invention in which the bearings 33 supporting the input gear 22 are replaced by bearings 33', 41. In case of this embodiment, since the inner and outer peripheral cylindrical surfaces 38, 37 are supported at both sides of the sprag 26 through ball bearings 33', 41 respectively by the rotation shaft 21, the concentricity of the surfaces is easy to obtain, and the locking effect of which with the sprag 26 becomes more reliable.

Figure 17:
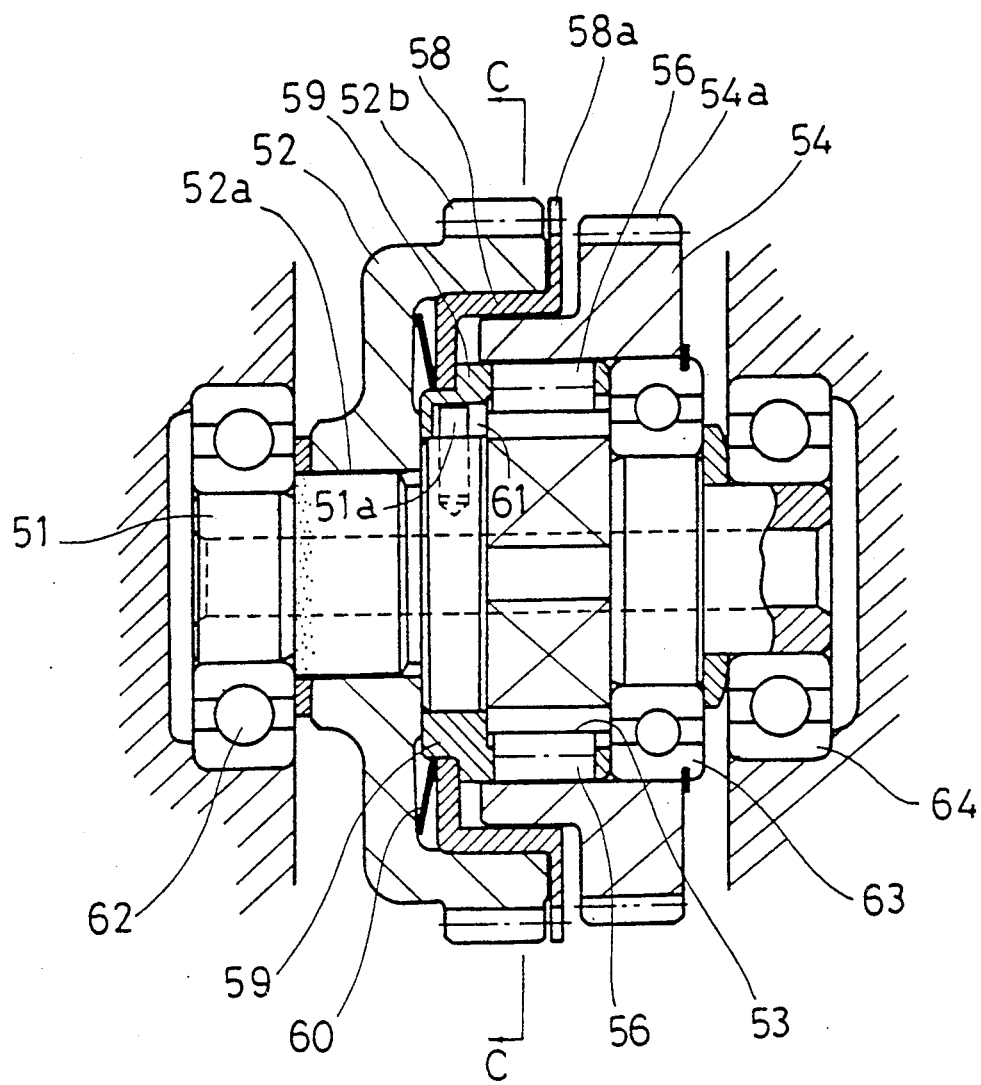
FIG. 17 is a vertical sectional view of the fifth embodiment.
Figure 18:
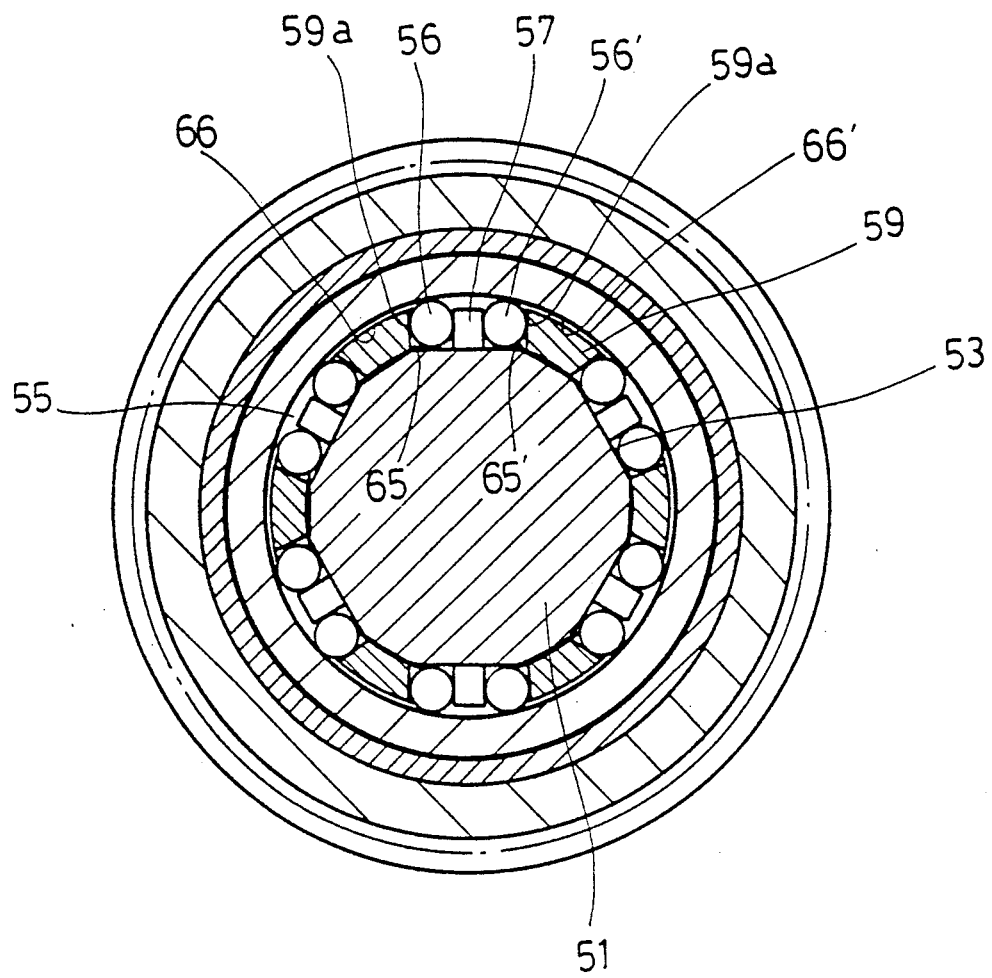
FIG. 18 is a transverse cross section taken along line C—C of FIG. 17.

In FIG. 17, 51 is a rotation shaft having various stepped portions on the outer peripheral surface. 52 is an input gear which is connected to one of the stepped portions of the rotation shaft 51 through a spline 52a. 52b is a tooth formed on the outer periphery of the input gear 52, which is engaged with a gear of a drive shaft (not shown). 53 is a polygonal surface cam, which is formed on another stepped portion of the outer periphery of the rotation shaft 51 in parallel to the input gear 52. 54 is an output gear, which is disposed with clearance 55 to the outer periphery of the polygonal surface came. 54a is a tooth formed on the outer periphery of the output gear 54, which is engaged with a gear of a driven shaft (not shown).

Figure 19:
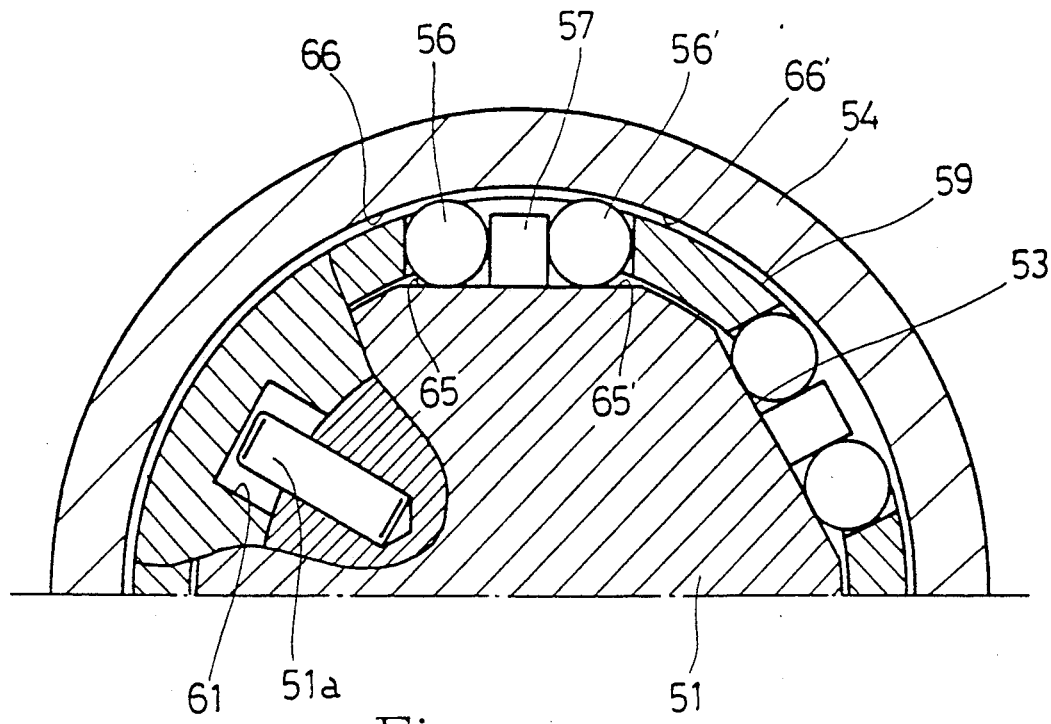
FIG. 19 is an enlarged view of the relevant parts of FIG. 18.

As shown in an enlarged view of important parts of FIG. 19, a pair of rollers 56, 56' are disposed on a pair of surfaces 65, 66, and 65', 66' of a wedge-like sectional gap 55 (hereinafter referred to as a wedge-like surface) in the clockwise and counterclockwise direction formed between the inner peripheral cylindrical surface 66 of the output gear 54 and the polygonal cam surface 65 of the rotation shaft 51. Each pair of the rollers 56, 56' is stored in the pocket 59a of the holding member 59, and a spring 57 is inserted between the rollers to press the rollers 56, 56' respectively toward the walls opposed in parallel along the shaft direction of the pocket 59a. The rollers 56, 56' in the neutral condition, as shown in FIG. 19, are not in contact with either wedge-like surfaces 66, 66' in the clockwise or counterclockwise direction.

58 is a sub-gear which is inserted between the input gear 52 and the output gear 54. 58a is a tooth provided on the outer periphery of the sub-gear 58 which engages with a gear on the drive shaft (not shown) as in the case of the input gear 52. At the inner peripheral side of the sub-gear 58, the holding member 59 is inserted slidably around the rotation shaft 51. The sub-gear 58 and the holding member 59 are pressed in contact via a belleville spring 60 between the end surface of the stepped portion of the rotation shaft 51 and the side surface of the input gear 52. The inner peripheral side of the holding member 59 is partially cut out to make a cutout 61. Opposing to the cutout 61, a stopper 51a is protruded on the rotation shaft 51. 62 through 64 are bearings supporting the rotation shaft 51.

The operation of the fifth embodiment constituted as described in the above will now be explained.

Figure 20:
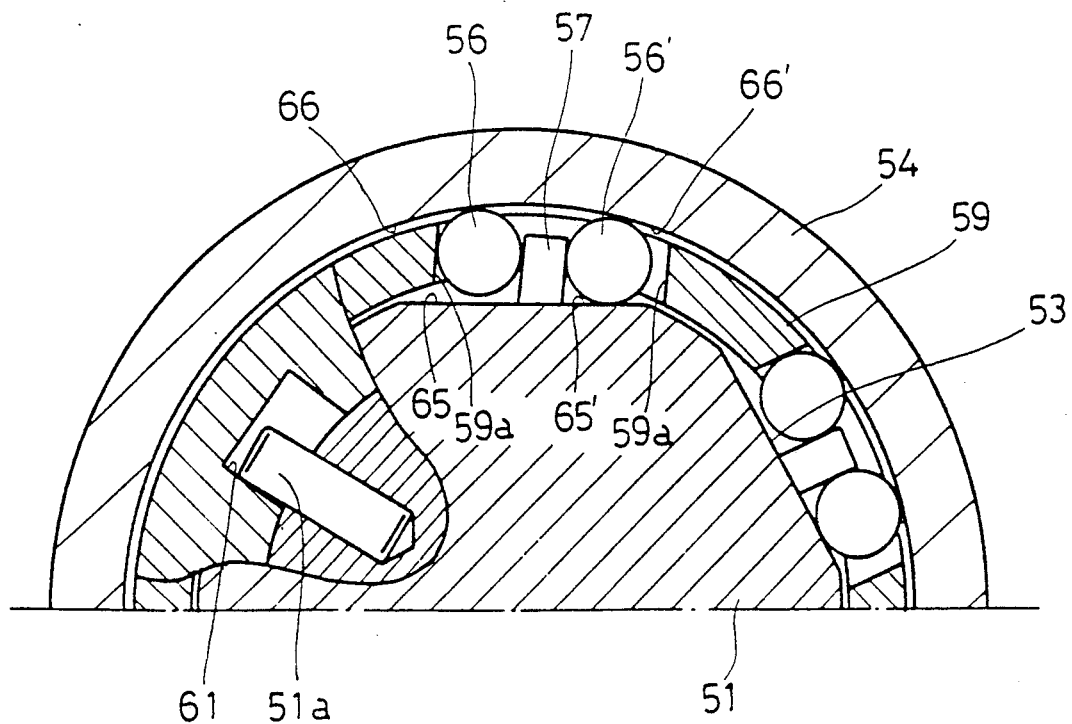
FIG. 20 is a cross-section showing the operation of the fifth embodiment.

In using this bidirectional differential clutch for the power transmission of the part-time type 4WD car, for example, the rotation of the drive shaft is transmitted to the input gear 52 and the sub-gear 58 engaging therewith. However, the rotation of the sub-gear 58 is later than the rotation of the input gear 52 in spite of the rotation of the same drive shaft because the numbers of teeth 58a of the sub-gear 58 are set to be greater than those of the teeth 52a of the input gear 52 in the same manner of the above-mentioned embodiment. Accordingly, as shown in FIG. 20, the holding member 59 pressed in contact by the sub-gear 58 rotates relatively in the clockwise direction, for example, with differential velocity against the rotation of the rotation shaft 51 rotating counterclockwise until the left side surface of the cutout 61 of the holding member 59 abuts the stopper 51a of the rotation shaft 51. Then the right side roller 56' as shown in a pair of the rollers 56, 56' stored in the pocket 59a of the holding member 59 is pressed to the wedge-like surfaces 65', 66' by the spring force of the spring 57.

When the 4WD car is driving with two wheels, the rotation of the output gear 54 is set to rotate faster than the input gear 52. Accordingly, the roller 56' is effected to rotate idle without bite in the wedge-like surfaces 65', 66'. It is natural for the roller 56 not to bite the wedge-like surfaces 65, 66 because the roller 56 is not in contact with the surfaces.

On the other hand, when rear wheels slip, the rotation of the drive shaft increases, the rotation of the polygonal cam 53 becomes faster than that of the output gear 54, and the roller 56' pressed to the wedge-like surfaces 65', 66' are effected to bite them, wherefore the rotational force of the rotation shaft 51 is transmitted to the output gear 54. After the stopper 51a abuts the wall surface of the cutout 61, the holding member 59 runs idly as regards the sub-gear 58, and there is no destruction on the sub-gear 58.

As described in the above, the clutch operational principle of the rollers 56, 56' based on the differential velocity of the sub-gear 58 has no relation with the direction of the rotation of the input gear 52. Accordingly, the bidirectional differential clutch of the fifth embodiment is effective in going backwards of the part-time type 4 wheel drive car.

Figure 21:
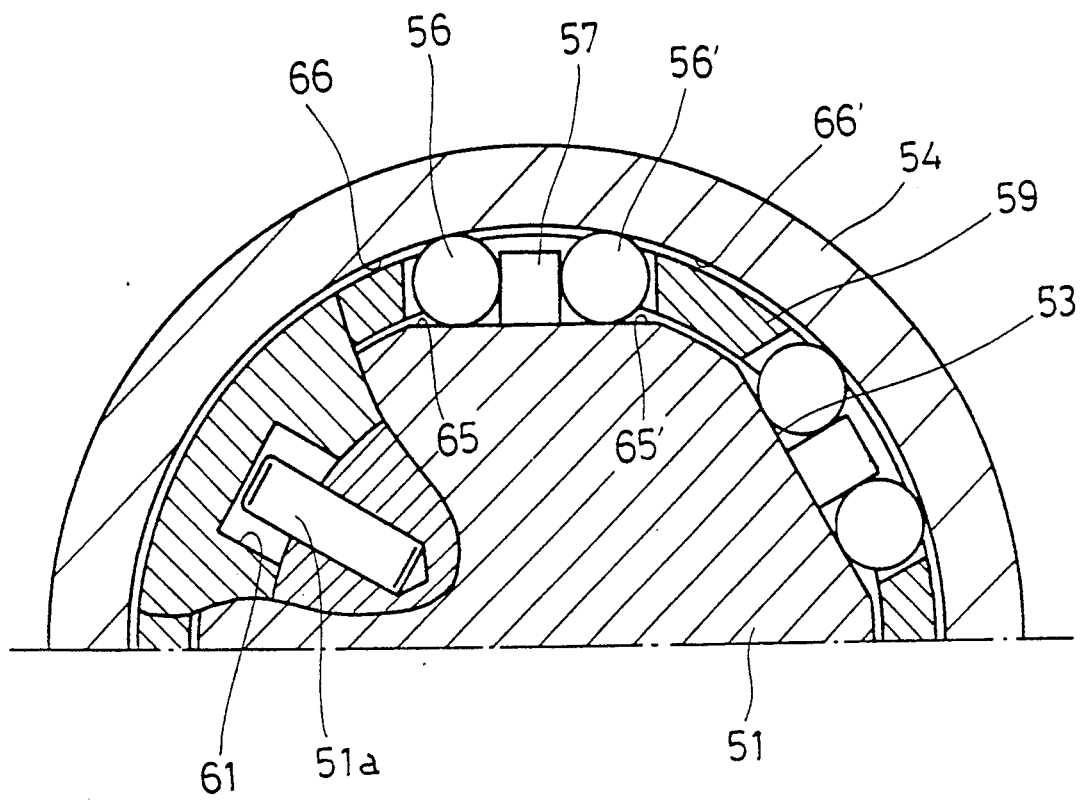
FIG. 21 is an enlarged view of the relevant parts of the sixth embodiment.

FIG. 21 shows the sixth embodiment of this invention in which the rollers 56, 56' in the neutral condition are in contact with the wedge-like surface 65, 66, 65', 66' as a different point comparing to the fifth embodiment, and the other structure and operation are the same as the fifth embodiment.

Figure 22:
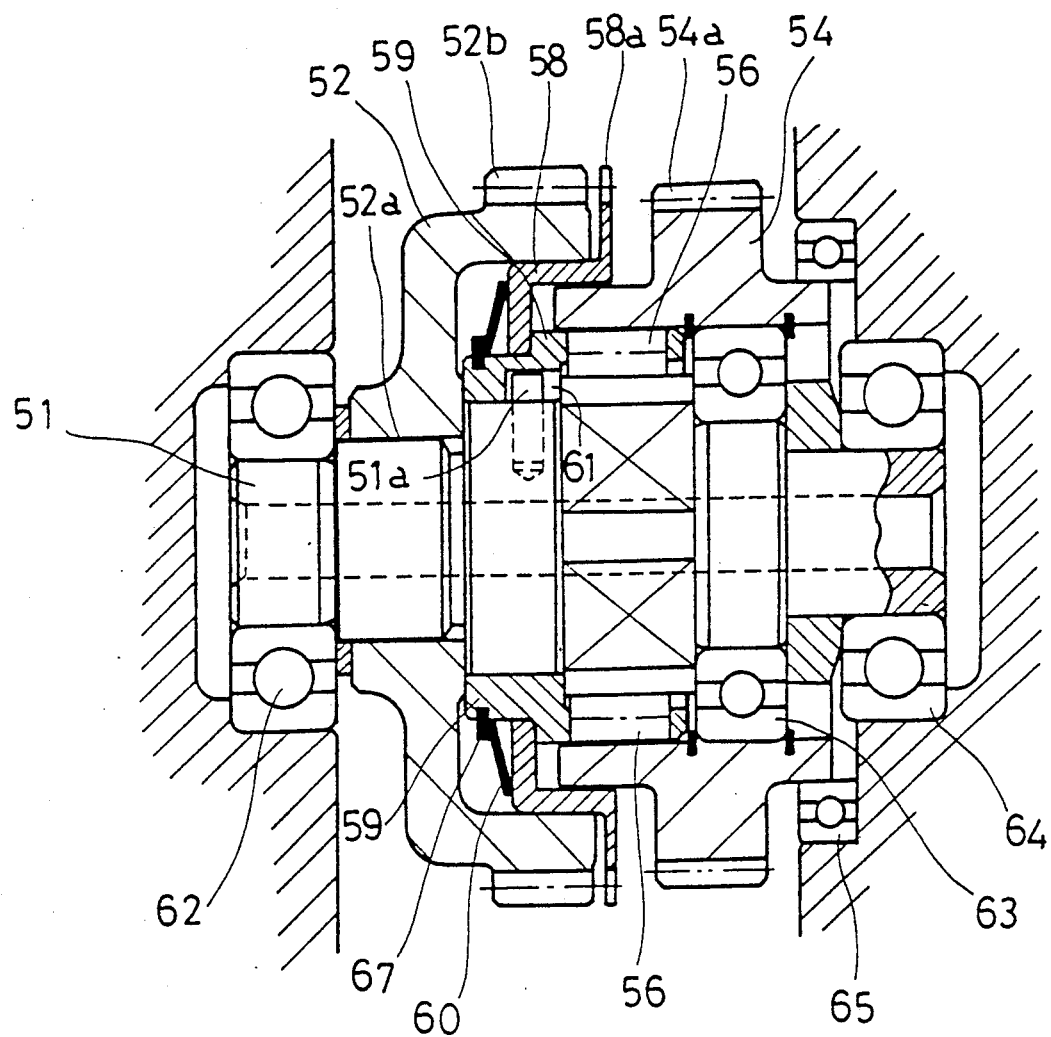
FIG. 22 is a vertical sectional view of the seventh embodiment.

FIG. 22 shows the seventh embodiment of this invention in which the structure for pressing of the holding member 59 and the sub-gear 58 is only different from that of the fifth embodiment. That is, the sub-gear 58 is pressed in contact via the belleville spring 60 between the retaining ring 67 secured to the holding member 59 and the side surface of the stepped portion of the holding member 59.

What is claimed is:

1. A bidirectional differential clutch comprising:
an input member having a first cylindrical surface;
an output member having a second cylindrical surface which is spaced from said first cylindrical surface of said input member, said input member and said output member being rotatable relative to each other;
a plurality of engaging members interposed in the space between said first cylindrical surface and said second cylindrical surface;
holding means inserted into said space and having a plurality of pockets for receiving said engaging members, said holding means being movable in a circumferential direction of said space so as to move each said engaging member from a neutral position in which each said engaging member does not engage with said first and second cylindrical surfaces to an operational position in which each said engaging member is engaged between said first cylindrical surface and said second cylindrical surface, said holding means permitting each said engaging member to move from said operational position toward said neutral position when the rotational speed of said input member is slower than that of said output member; and a sub-member operatively connected with said holding means and being rotatable in the same direction as said input member at a speed slower than the rotational speed of said input member so as to force said engaging members from said neutral position toward said operational position;

whereby said output member rotates relative to said input member when the rotational speed of said input member is lower than that of said output member, while the rotation of said input member is transmitted to said output member when the rotational speed of said input member is higher than that of said output member.

2. The bidirectional differential clutch as defined in claim 1, wherein said engaging members are a plurality of sprags;

said holding means including a first holding member fixed to said first cylindrical surface and a second holding member which is disposed adjacent said second cylindrical surface and is operatively connected with said sub-member, and said pockets include first pockets formed in said first holding member and second pockets formed in said second holding member for receiving corresponding part of each of said sprags in such a manner that said sprags are oriented in a radial direction at said neutral position and that sprags are tilted from the radial direction at said operational position.

3. The bidirectional differential clutch as defined in claim 2, wherein said first cylindrical surface is positioned outwardly of said second cylindrical surface.

4. The bidirectional differential clutch as defined in claim 3, wherein said input member includes an input gear having an internal surface forming said first cylindrical surface, said output member includes an output gear and a rotational shaft fixed thereto and having an outer surface forming said second cylindrical surface, said holding member is supported by said rotational shaft though a first bearing, and said input gear is supported by said rotational shaft through a second bearing and is also supported by said holding member.

5. The bidirectional differential clutch as defined in claim 1, wherein said first cylindrical surface is provided with a polygonal cam forming wedge-like surfaces in cooperation with said second cylindrical surface, said engaging members are a plurality of pairs of rollers each disposed within said pockets, so that one of said rollers of each said pair of rollers engage corresponding said wedge-like surfaces irrespective of rotational direction of said input member and said output member, said input member and said sub-member includes an input gear and a sub-gear, respectively, which are engaged with a common drive gear, the number of teeth of said sub-gear is greater than that of said input gear, so that the rotational speed of said sub-gear is lower than that of said input gear.

* * * * *